United States Patent [19]

Abendschein et al.

[11] Patent Number: 5,283,848
[45] Date of Patent: Feb. 1, 1994

[54] CIRCULAR MULTI-FIBER FIBER-OPTIC CONNECTOR

[75] Inventors: Frederic H. Abendschein, Columbia; Edmund J. Haley, Dillsburg; Alan E. Plotts, Harrisburg; Robert N. Weber, Hummelstown, all of Pa.

[73] Assignee: The Whitaker Corporation, Wilmington, Del.

[21] Appl. No.: 995,724

[22] Filed: Dec. 23, 1992

[51] Int. Cl.$^5$ .............................. G02B 6/36
[52] U.S. Cl. ............................ 385/59; 385/60; 385/71
[58] Field of Search ..................... 385/59, 71, 60

[56] References Cited

U.S. PATENT DOCUMENTS

| | | | |
|---|---|---|---|
| 4,140,367 | 2/1979 | Makuch et al. | 385/59 |
| 4,443,052 | 4/1984 | Eaby et al. | 339/113 R |
| 4,789,218 | 12/1988 | Paul et al. | 385/59 X |
| 5,125,056 | 6/1992 | Hughes et al. | 385/59 |

FOREIGN PATENT DOCUMENTS

| | | | |
|---|---|---|---|
| 0062417 | 5/1980 | Japan | 385/59 |
| 2124793 | 2/1984 | United Kingdom | 385/59 |

Primary Examiner—John D. Lee
Assistant Examiner—Hemang Sanghavi
Attorney, Agent, or Firm—Driscoll A. Nina, Jr.

[57] ABSTRACT

A multi-fiber fiber-optic connector is provided containing a cartridge having a front radial flange containing peripheral, circumferentially-spaced notches in each of which a fiber-optic terminal is axially positioned, and having a rear radial flange containing peripheral, circumferentially-spaced notches in each of which a fiber-optic clamp body is axially positioned. The fiber-optic terminals are spring-biased forwardly toward the open end of the connector, and a preload plate holds them in a preloaded state. Each of the terminals is provided at its outer end with a surrounding, axially-extending resilient split sleeve, the outer end of which is empty to receive a fiber-optic terminal of a mating conductor similar to the above-described connector, but without the split sleeves. Each fiber extends between the front flange and the rear flange non-axially, the crimp-held end of each fiber instead being aligned with the fiber-optic terminal circumferentially next to the one which is aligned with the crimp body for that fiber.

11 Claims, 9 Drawing Sheets

CIRCULAR MULTI-FIBER FIBER-OPTIC CONNECTOR

FIELD OF THE INVENTION

This invention relates to fiber-optic connector systems, and especially to such systems which are generally circular in cross-section and provide connection for a plurality of fibers.

BACKGROUND OF THE INVENTION

It is common to connect together fiber optic cables each of which includes a plurality of optical fibers. To this end it is known, for example, to use a separate connector for each pair of the fibers to be connected; optical continuity is provided by either butting the smooth ends of the cables to each other in the connector, or by securing them in a closely-spaced confronting configuration. When they are to be butted against each other, it is known to spring-bias one or both of the fiber ends toward the other to maintain the desired fixed physical contact. To prevent relative motion of the fiber ends due to excessive tension on, or vibration of, the fibers, it is also known to fix the fibers physically to the connector at one position, and then leave a certain amount of slack in each fiber between the point of such physical connection and the ends of the fiber.

It is desirable in many cases to provide a multi-fiber, generally-circular, plug-and-receptacle type of fiber-optic systems, broadly analogous in a practical sense to a circular multi-wire electrical connector, to provide easy and reliable connection and disconnection of optical fiber cables. It is known to provide such a connector system using direct butt-end contact of the fiber pairs to each other, in some cases with spring biasing of one against the other, but such known fiber-optic connector systems generally exhibit certain drawbacks with regard to such factors as simplicity of construction, assembly and disassembly, reliability, low-cost, and overall convenience and efficiency.

One difficulty often encountered in such connectors, for example, lies in the fact that when the terminal ends of the fibers are spring-mounted so they can move axially, and the fibers are held fixed at another point near where they enter the connector to protect the spring-biased terminal end against motion induced by tension or vibration in the external fiber-optic cable, then it is necessary for the fibers inside the connector to flex from a straight-line configuration through rather sharp angles as the terminal ends of the fibers move back and forth axially during normal use. If the spring-mounted fiber terminals are very close to the point at which the fiber is fixedly secured to the connector, it will be difficult for such a fiber to absorb the motion of the fiber terminal; however, if this distance is increased substantially, then the connector becomes undesirably longer. One aspect of the present invention mitigates this difficulty. Other drawbacks encountered in circular multi-fiber relate to the exact way in which the components are constructed and arranged, and the difficulties in manufacture, assembly, disassembly and use which typically arise from such constructions.

SUMMARY OF THE INVENTION

In accordance with one aspect of the invention, the plug connector and the receptacle connector of such a connector assembly each comprise an outer shell containing an axially-aligned cartridge, or "carousel", having a shaped rear flange supporting, in a circular array, the members which secure the fibers fixedly to the connector, and having a shaped front flange which supports the fiber-optic terminals, extending axially in a circular array. The terminals are mounted for limited axial motion, and are spring-biased forwardly toward the open end of the connector; they are preferably also provided with a spring-preload plate holding the springs in a partially compressed state, thereby to assure a substantial minimum spring bias on the terminals which urges them forwardly with substantial force when they are in butt-end contact with the ends of the fiber-optic terminals of the associated, mated connector. For this purpose, one end of each biasing spring is preferably restrained by the shaped front flange and the other end by the spring preload plate. The front and rear flanges of the cartridge are provided with notches positioned around their peripheries to hold the fiber-optic terminals and the crimp bodies, respectively, which are easily slipped laterally into the notches.

Over the forward ends of the fiber-optic terminals of the receptacle connector there is preferably placed an alignment sleeve module, in the form of a disc in which a plurality of longitudinally-split alignment sleeves are loosely mounted, in alignment with the forward ends of the fiber-optic terminals of the receptacle connector. Each sleeve is of such a length that, when the module is seated on the ends of the terminals, there is a remaining length of empty sleeve for receiving the end of a corresponding fiber-optic terminal of the plug connector, the split sleeves serving to provide easy stress-free coupling of the two connectors as they are mated. The alignment sleeve module may instead, in some cases, be placed over the terminals of the plug connector.

The plug connector preferably comprises essentially the same structure, but normally without the alignment sleeves, whereby its fiber-optic terminals protrude so as to be matable in the split sleeves of the receptacle connector.

In accordance with another aspect of the present invention, adequate, easy and safe flexing of the fibers when the spring-biased terminals move axially is provided by securing one end of each fiber fixedly to the connector shell at one circumferential position, and connecting the other end of the fiber to a fiber-optic terminal other than the one axially aligned with the position where it is secured to the connector shell, whereby the slack portion of the fiber has a greater length and a predetermined flexed initial configuration, so it is able to flex more easily and less acutely, and more predictably, than if the fiber extended exactly axially between axially aligned end positions. That is, preferably each fiber is fixed to the rear flange of the cartridge at a point one position further around the flange than the position of the fiber-optic terminal to which it is connected at its opposite end. The result is that the connector can be made shorter than otherwise, without danger of harm to the fiber or excessive loss of light passing through it, when it flexes due to axial motion of the fiber-optic terminals.

DESCRIPTION OF THE DRAWINGS

These and other objects and features of the invention will be more readily understood from a consideration of the following detailed description, taken with the accompanying drawings, in which.

DESCRIPTION OF THE INVENTION

Figure 1:
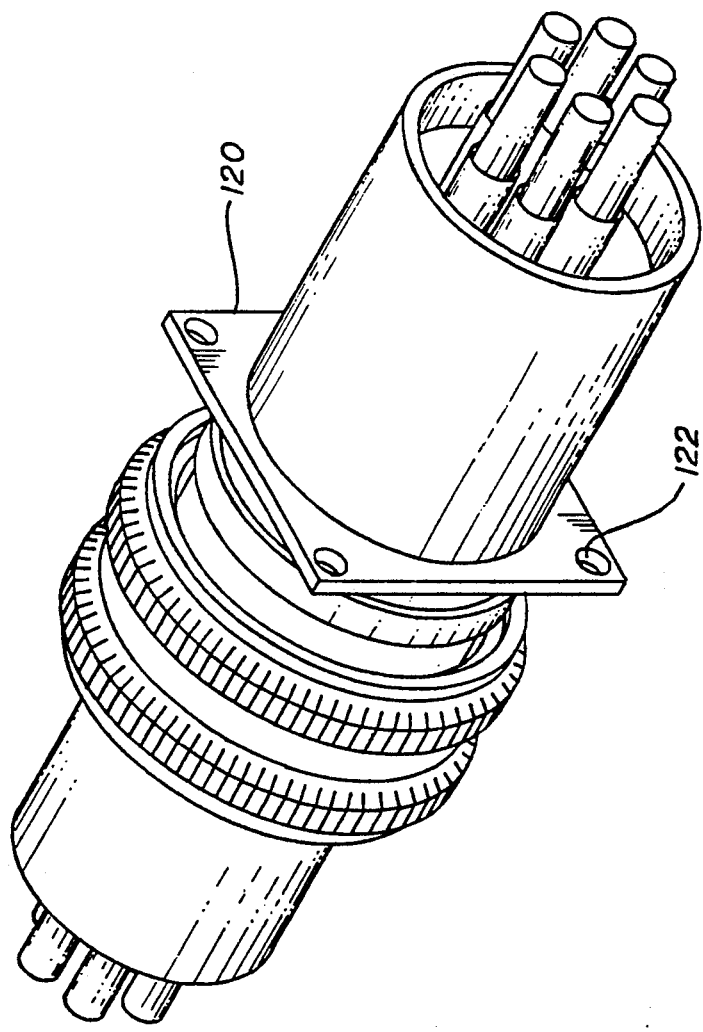
FIG. 1 is a perspective view showing the exterior of a plug connector on the left, mated with a receptacle connector on the right, and with respect to which the preferred embodiment of the invention will be described.
Figure 2:
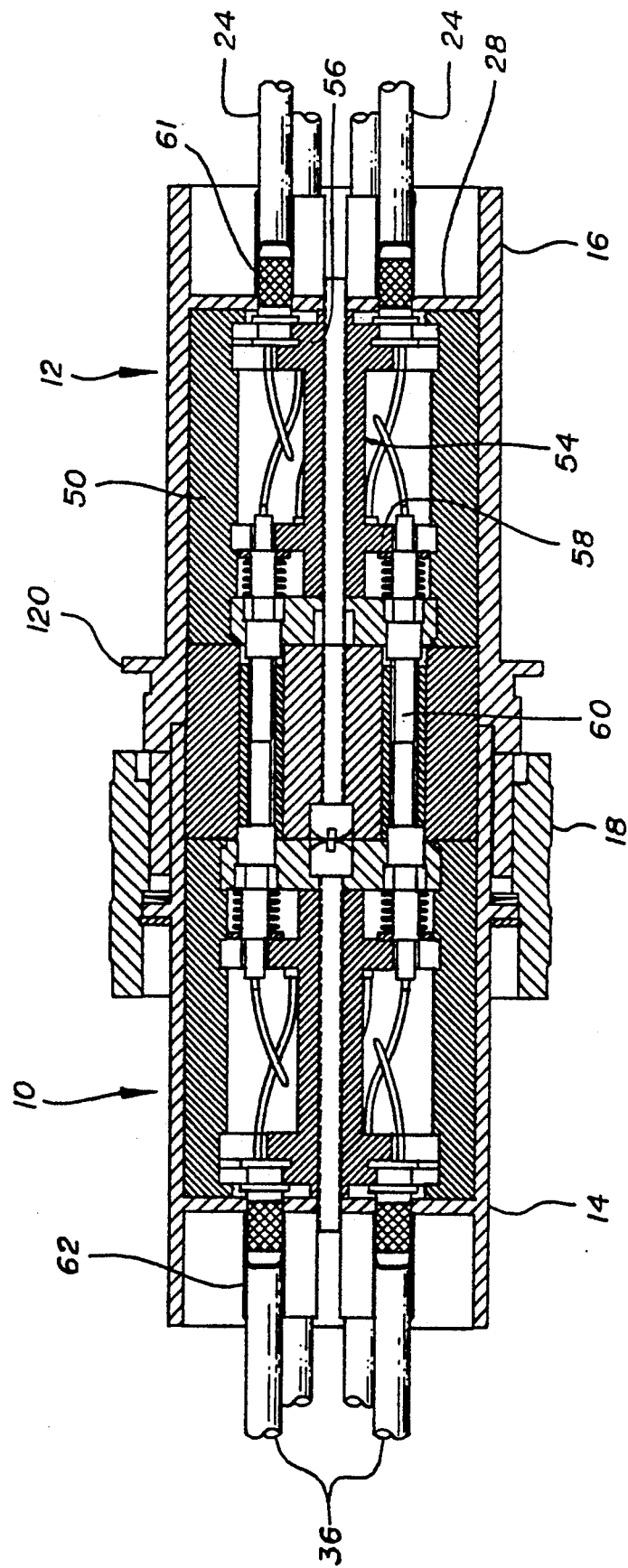
FIG. 2 is a longitudinal sectional view of the mated connectors of FIG. 1.
Figure 5:
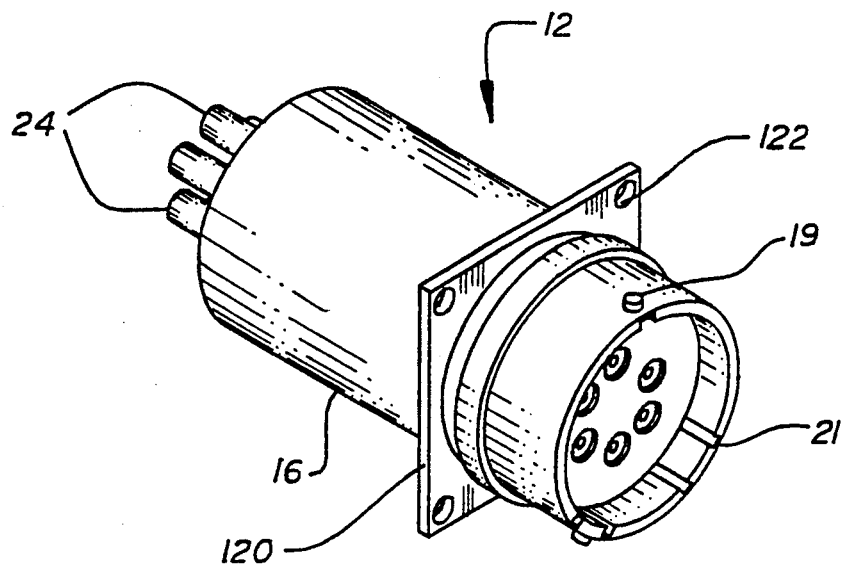
FIG. 5 is a perspective view showing the exterior of the receptacle connector of FIG. 4.
Figure 6:
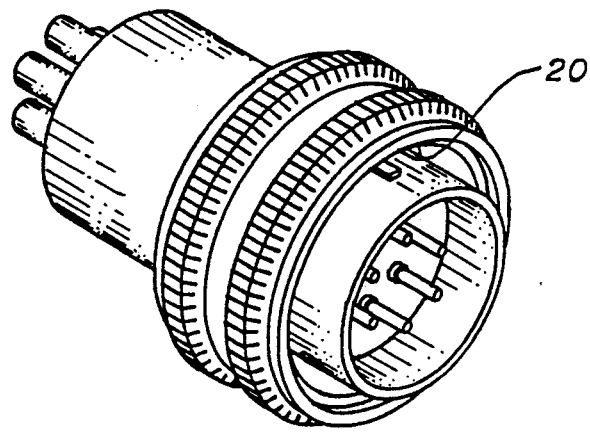
FIG. 6 is a perspective view of the plug connector of FIG. 3.

Referring now to the preferred embodiment of the invention shown in the accompanying drawings by way of example only, the complete connector system shown in FIGS. 1 and 2 comprises what are here termed the plug half 10 and the receptacle half 12, the outer shells 14 and 16 of which, respectively, are held together by a coupling nut 18 and an associated wave washer 20 in a conventional bayonet type connection; the end of the receptacle shell is inserted into the coupling nut on the plug shell, and the coupling nut is advanced by turning it clockwise, until it locks into its most forward, predetermined angular and axial position. To accomplish this, the bayonet members such as 19 (FIG. 5) on the exterior of the receptacle shell and the alignment members 20 (FIG. 6) cooperate with grooves 21 on the interior of the receptacle shell to assure that the two half connectors are always coupled in the same predetermined mutual angular position and advanced by the same predetermined distance toward each other when tightening of the coupling nut is complete. These two outer shells and the arrangement for mechanically coupling them together are well known, standard configurations commonly used in the electrical connector art, and hence need not be described here in detail. It is in fact a feature of the present invention that the remainder of the fiber optic connector assembly to be described herein fits within, and is compatible with, this standard type of shell and coupling arrangement.

In this example it is assumed that there are six fiber optic cables such as 24, entering the rear of the receptacle connector half 12 through corresponding openings in its end closure 28 and that they are to be optically coupled to the six optical fibers such as 36 extending from the rearward end of the plug connector 10. However, the invention is applicable to interconnecting any number of optical fibers.

Figure 4:
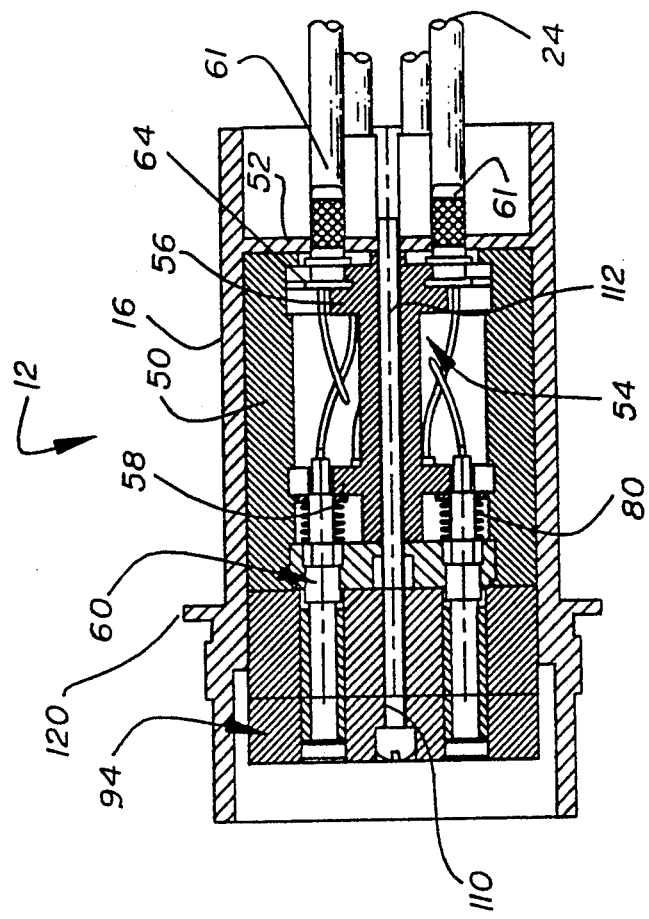
FIGS. 3 and 4 are longitudinal sectional views of the plug and receptacle connectors of FIG. 2.
Figure 3:
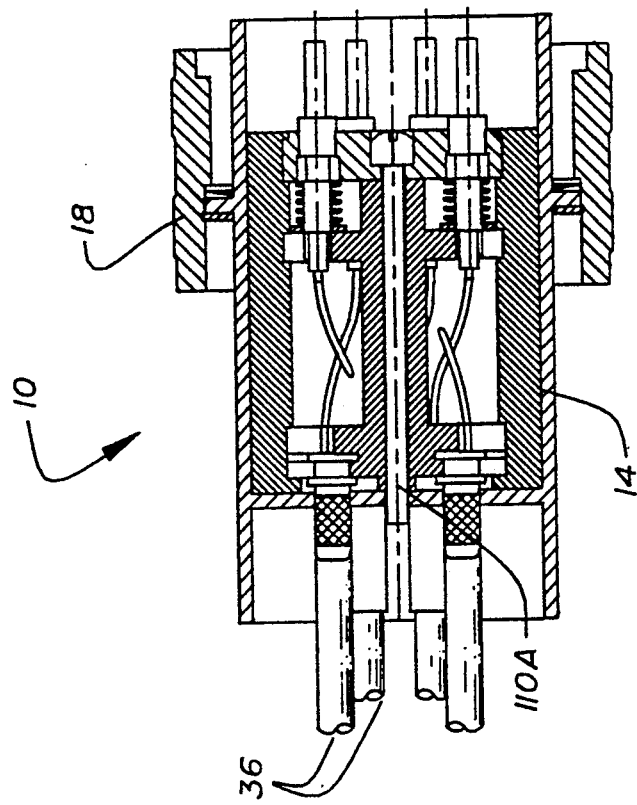
Figure 7:
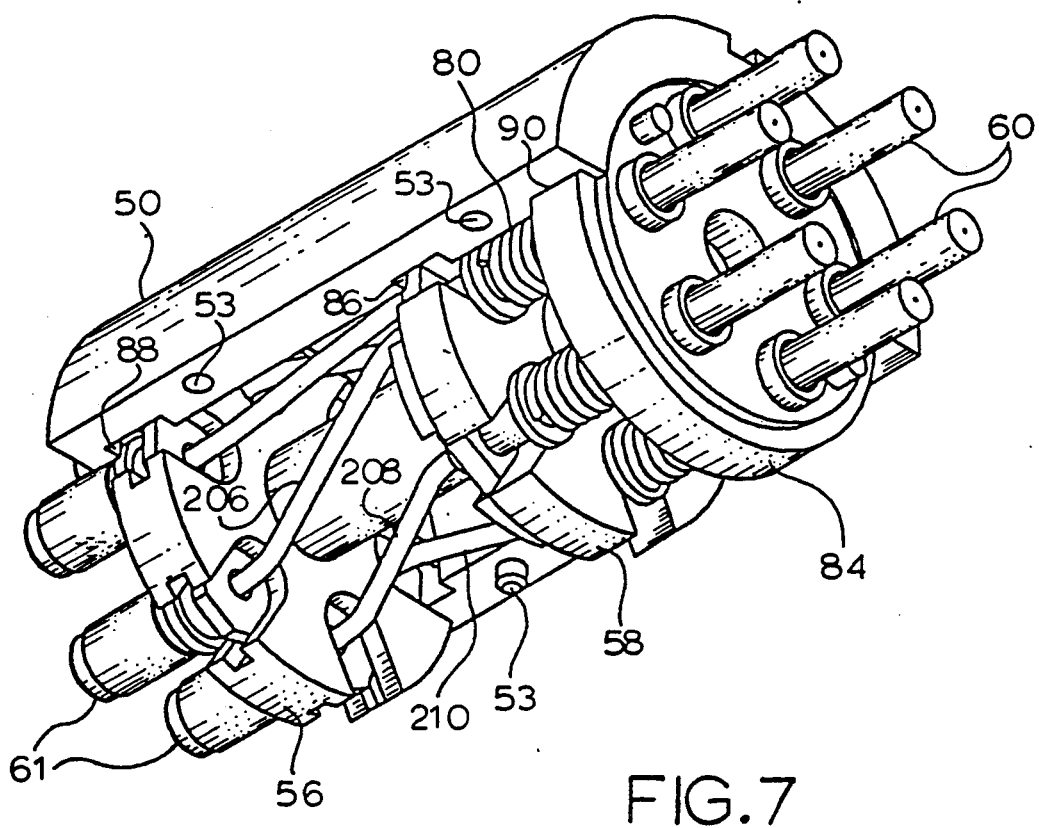
FIGS. 7 and 8 are perspective views of the cartridge holder, the cartridge, and various parts mounted thereon which are enclosed in the plug and receptacle connectors.
Figure 8:
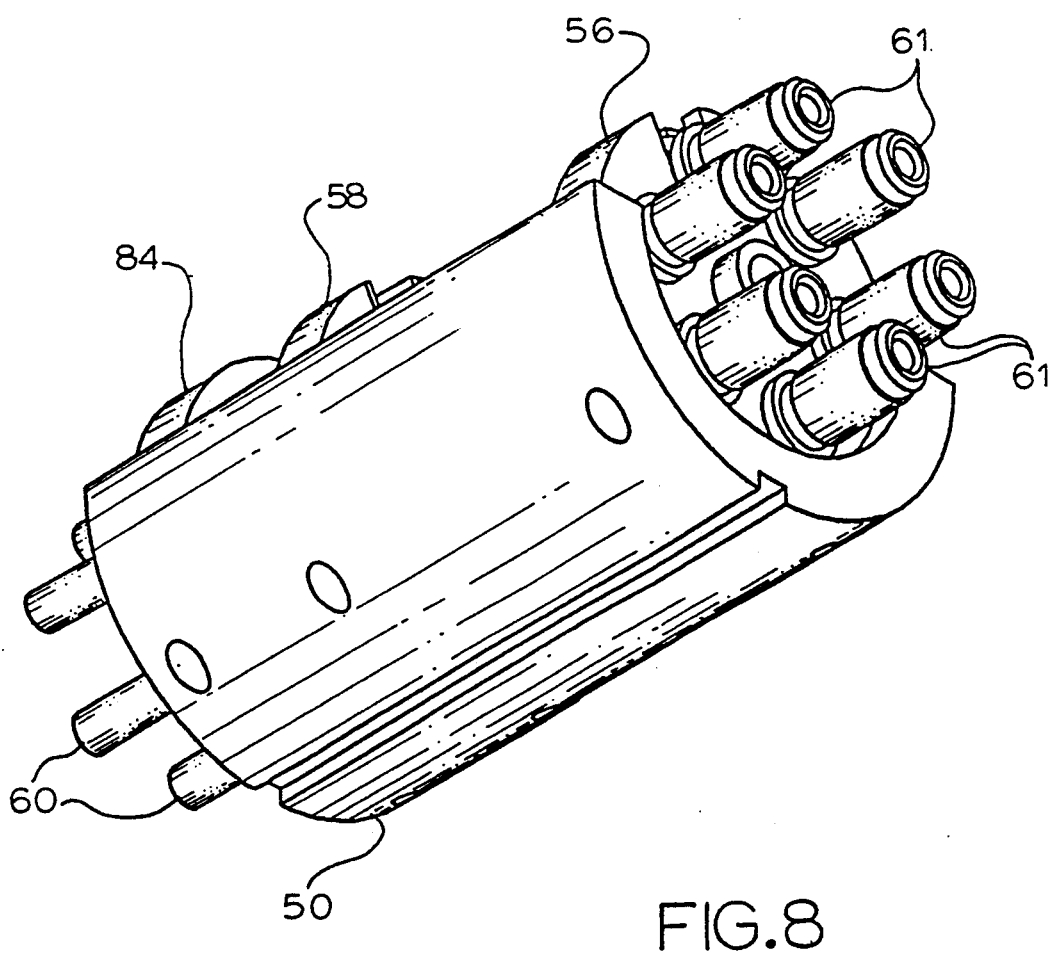
Figure 9:
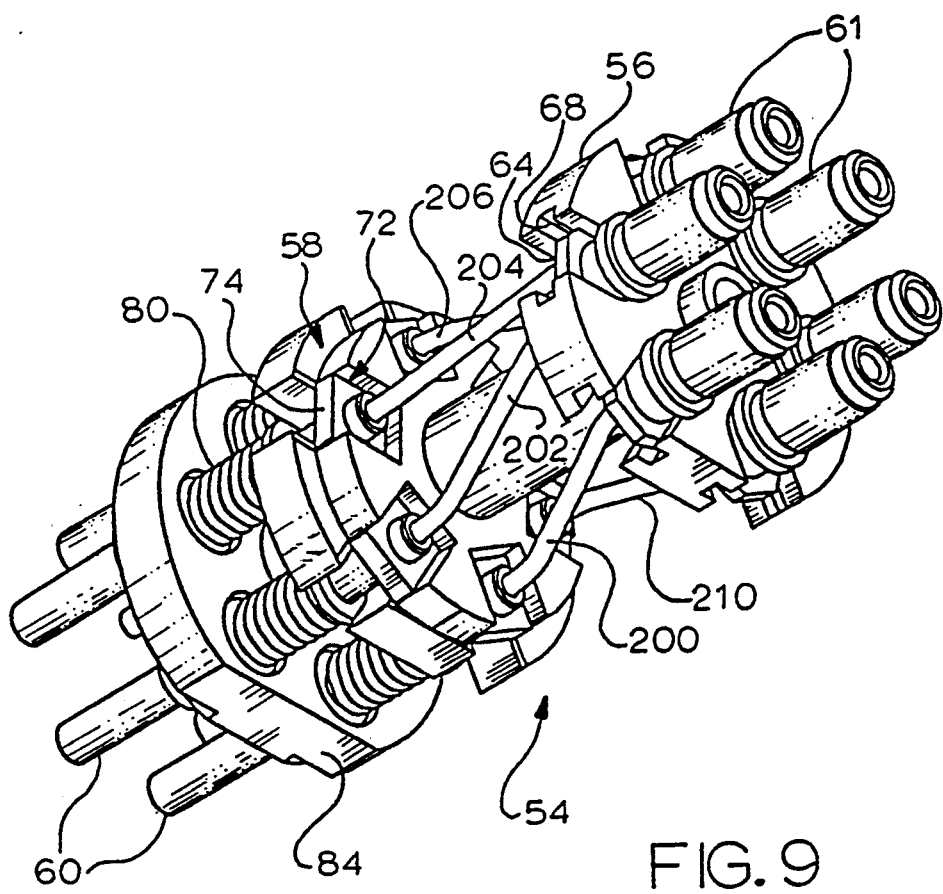
FIGS. 9 and 10 are perspective views of the assembly of FIGS. 7 and 8 with the cartridge holder removed, and viewed from opposite ends.
Figure 10:
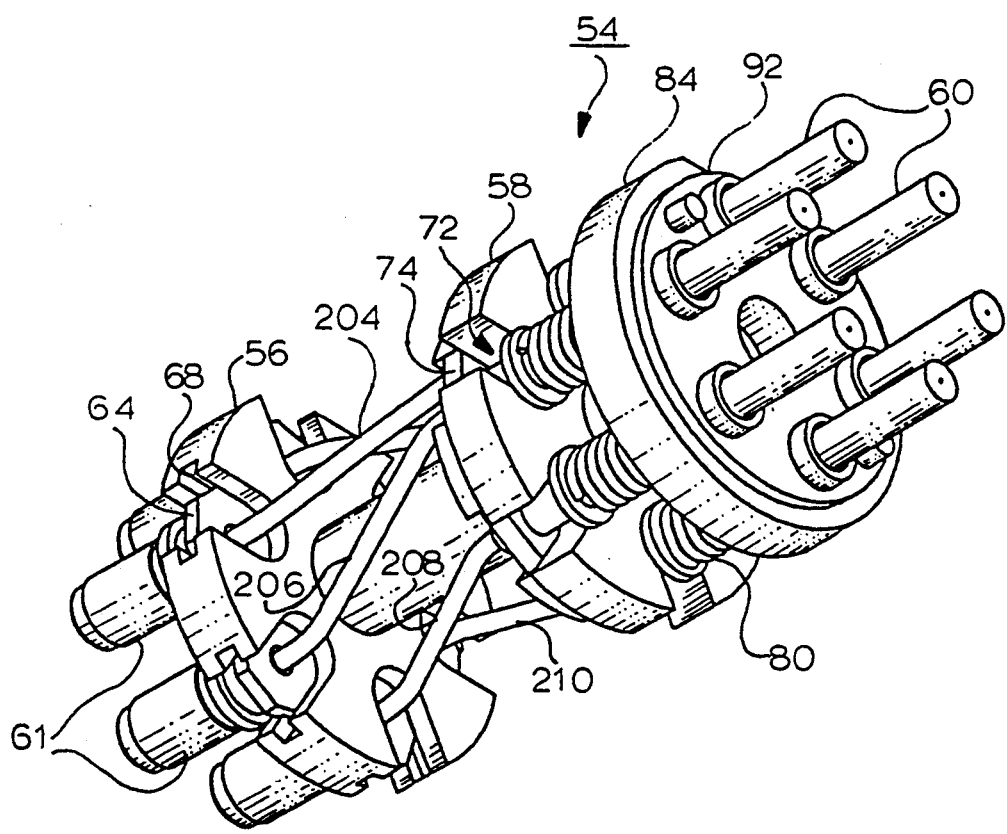

Considering first the receptacle half of the connector assembly as shown at the right in FIGS. 2 and 4 (see also FIGS. 5, 7 and 8) for example, a generally cylindrical cartridge holder 50 fits tightly within shell 16 and bottoms against the integral closed end 52 of the shell. Cartridge holder 50 is preferably longitudinally split to permit it to be divided into two halves (FIGS. 7 and 8), preferably mated to each other by means of a pair of small integral bosses such as 53 on one half which mate with corresponding depressions such as 53' in the other half.

A cartridge 54 (FIGS. 2, 4, 9 and 10) is mounted in holder 50, and is preferably of a plastic material. The cartridge has a shaped rear flange 56 extending radially near the closed end of the shell, and has a shaped front flange 58 extending radially near the open end of the shell. Rear flange 56 holds and retains the six fibers such as 24 which enter the rear end of the plug through openings in the end closure 28 of the shell, thus fixing their position with respect to the cartridge holder 50 and thereby also with respect to the associated outer shell 12. Front flange 58 holds the six fiber-optic terminals such as 60 in a manner such that they are axially movable over a limited range against a spring bias urging them toward the open end of the connector. The details of these inner components of the receptacle will now be described.

Each of the fibers 24 is held in a crimping assembly, comprising a crimp body such as 61 which surrounds the core and cladding of the fiber, and an outer crimp eyelet 62 FIG. 2) is preferably used to crimp and hold the other buffering of the fiber. Such an arrangement and its crimping may be entirely conventional in themselves, it being understood that the fiber is not terminated or cut at this point but extends onward to its corresponding fiber-optic terminal near the open end of the shell.

Each crimp body 61 is held in the rear flange 56 of the cartridge by means of a small radial flange such as 64 (FIG. 10) on the crimp body which fits edgewise into a corresponding slotted notch 68 (FIGS. 9 and 10) in the peripheral edge of the rear flange 56, and into which it is readily insertable by pressing it laterally into the notch. This permits ready assembly and disassembly of the crimp bodies to and from the rear flange. With the crimp bodies held fixed in this manner, tension applied to the fibers 24 tending to pull them outwardly of the connector receptacle, as well as vibrations of these fibers, will not be transmitted inwardly of the connector beyond the rear flange in which the crimp bodies are mounted, thereby isolating the remainder of the plug from the adverse effects of these forces, as described above.

Figure 11:
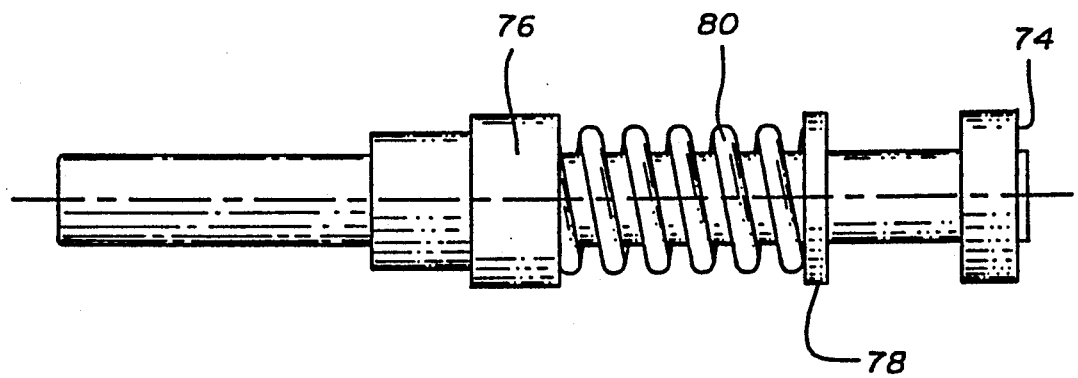
FIG. 11 is an enlarged side view of a typical fiber-optic terminal used in the connectors of the other figures.

Each optical fiber, consisting of the usual core and cladding but less the buffering, extends forwardly from the rear flange to its respective fiber-optic terminal such as 60, of which there are six in this example. Each fiber is secured in its terminal in conventional manner, involving feeding the fiber through the central bore in the terminal until it extends from the far end, securing it therein with an epoxy cement, and grinding off and polishing the forward end of the fiber, normal to its axis, to provide the desired flat surface for butt-end coupling to another fiber in the mating plug connector. Each fiber-optic terminal lies in an axial orientation in a corresponding notch such as 72 (FIGS. 9 and 10) in the peripheral edge of the front flange 58. More particularly, each terminal is provided with a radial head 74 (FIG. 11), with a shoulder member 76 and with a washer 78; a spiral spring such as 80 extends between the front flange and the shoulder member. The head 74 is received and trapped in a slot formed in the notch 72 in the peripheral edge of the front flange. Accordingly, each fiber-optic terminal is spring-biased forwardly by its respective spring member to a maximum forward position limited by the terminal head 74, and can be moved axially rearwardly by pressing it rearwardly against the bias of its spring. Thus each terminal has a limited range of axial motion, and is spring-biased in the forward direction.

Also provided in this preferred embodiment is a preload plate 84 (FIGS. 9 and 10) having six openings through it, one for each of the front ends of the fiber-optic terminals, and adapted to slide over the ends of the terminals and against the forward end of the shoulders 76 on the terminals. It is noted that the front and rear cartridge flanges 56 and 58 are captured in respective circular grooves 86 and 88 on the inside of the cartridge holder 50, and a similar groove 90 is provided to hold preload-plate 84 in position; for the preload plate to fit in its assigned groove, it must be urged rearwardly, compressing the springs somewhat, thereby providing a preloading of the springs, and assuring that even in the position of greatest extension of the springs they will exert substantial spring force when initially further compressed by pressure of the fiber-optic terminals with which they mate. The preload plate not only provides the above-described preload, but also assists in maintaining the desired axial orientation of the terminals. The plate is preferably provided with a flat 92 on its periphery which matches a flat in its corresponding holder groove, to hold it against rotation. The same is true for the front and rear flanges.

Figure 12:
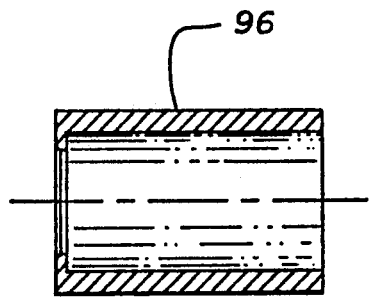
FIG. 12 is a longitudinal sectional view of the split-sleeve holder used to hold the longitudinally split sleeve.
Figure 13:
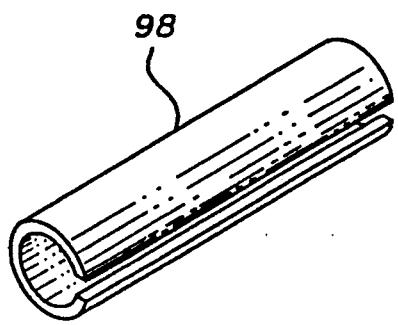
FIG. 13 is a perspective view of the split sleeve.

To provide for suitable alignment and easy mating of the fiber optic terminals of the two halves of the connector, an alignment sleeve module 94 is provided which is typically of plastic, and cylindrical in form, so as to fit tightly within the outer shell 16. It contains a plurality of axial bores, six in this example, each aligned with one of the fiber optic terminals such as 60. In this example, the alignment sleeve module is made in two parts, which may be held together by small axially extending screws; the bores in each half of the module contain a closely fitting sleeve holder such as 96 (FIG. 12) which receives one end of a longitudinally-split resilient sleeve such as 98 (FIG. 13), which is captured in the sleeve holder and extends through both bushings and both halves of the module, as shown. Each bushing has a small, radially-inwardly extending flange 100 (FIG. 12) at one of its ends, to capture the split sleeve loosely in the two bushings, thus holding it but permitting it to flex and expand. Each split sleeve is of a diameter to receive slidingly the forward end of a corresponding one of the fiber optic terminals of the receptacle, each of which extends halfway through its respective sleeve, leaving the other half empty to receive the forward end of the corresponding fiber-optic terminal of the plug of the mated connector. The resilient split-spring sleeves make it possible to mate the butt ends of the connectors of the two halves of the assembly easily and safely.

An axial screw 110 extends through a central bore 112 in the cartridge, and is threaded into an opening in the center of the shell end closure 28 to hold the assembly together.

As to the plug connector of the assembly, while its outer shell differs, conventionally, from that of the receptacle assembly for the reasons indicated above, it may otherwise be substantially the same as the receptacle connector just described, except that it will not normally contain an alignment sleeve module or the associated split sleeves, since this function is, in this example, provided by the receptacle connector. Accordingly, corresponding parts of the plug connector are indicated by the same numerals as are used for the corresponding parts of the receptacle connector, each followed by the letter "A".

It is noted that the receptacle shell has, as is typical, an exterior mounting flange 120 extending normally to the axis of the connector and containing appropriate mounting holes such as 122 for securing it to any suitable support such as a cabinet, for example.

Turning now to the fiber segments 200, 202, 204, 206, 208 and 210 (FIGS. 9 and 10) extending between the front and rear cartridge flanges, it will be seen that each such fiber segment extends between one of the crimp bodies on the rear flange and not the fiber-optic terminal aligned with it, but rather a terminal which is spaced circumferentially by one position from the aligned terminal; each fiber section contains a degree of slack and is flexed in an approximate sinusoid, even when the terminals are not mated with those of another connector. Accordingly, when the fiber-optic terminals move axially forward or backward in response to installation of the preload plate, or in response to pressure from the mating fiber-optic terminals, the fiber sections bow or flex easily in a predictable pattern, so as not to exceed the degree of bending which might damage the fibers or cause loss of light passing through them.

It will be appreciated from the foregoing that both the plug and the receptacle connector are easily made and assembled. Thus the crimped connections at the rear ends of the optical fibers may first be formed, and the forward ends of the fibers passed through their respective fiber optic terminals, where they are secured by appropriate epoxy cement and cut and polished to a flat mirror finish, leaving the appropriate length of fiber between the crimp bodies and the fiber optic terminals. The crimped connectors are then pushed into their axial positions about the periphery of the rear cartridge flange 56, and the fiber-optic terminals are similarly pressed inwardly into position on the periphery of the forward cartridge flange 58, being sure that each fiber-optic terminal is placed so that the desired one-place circumferential off-set is provided between each crimp body and its associated fiber-optic terminal. Next the preload plate 84 is slipped over the forward ends of the fiber optic terminals and pressed rearwardly to compress the springs sufficiently that the front and rear cartridge flanges and the preload plate can both be snapped into their corresponding circumferential grooves on the inside of the cartridge holder, and the cartridge holder then squeezed together transversely and slid inside the connector shell. The alignment sleeve module may then be slid into position over the ends of the fiber optic terminals, with its resilient split sleeves in position therein. The plug assembly may be accomplished in the same way, without however the need for installing the alignment sleeve module. In other cases, the module may be slid over the fiber optic terminals on what is here called the plug. Disassembly is easily performed, for example to check for a fault, by reversing the above-described sequence of steps. It is also noted that the connector is "scoop proof," i.e. one half of the connector cannot be mishandled so as to intrude into the shell of the other, so as to damage the fiber optic terminals of the other connector.

There has therefore been provided a circular multi-fiber connector which is easy to manufacture, assemble and disassemble, in which the fiber-optic terminals are spring-biased to provide desired spring pressure between the confronting butt ends of the fiber optic terminals of the two connector halves while isolating the terminals from the effects of tension or vibration exerted on the fibers entering the back of either connector half, so that the confronting and abutting faces of the fiber optic terminals of the two halves of the connector remain in fixed, quiet apposition, as desired. At the same time, the connector length is maintained relatively short, without danger of damaging the fibers or impairing the optical performance, by connecting each fiber between a clamp device which is at a circumferentially different, non-axially aligned position with respect to the fiber-optic terminal to which the fiber extends, thus permitting use of a longer fiber and providing a suitable initial bending of the fiber, permitting easy predictable flexure despite the short length of the fiber between the body-connected position and the fiber optic terminal.

While the invention has been described with particular reference to specific embodiments in the interest of complete definiteness, it will be understood that it may be embodied in a variety of forms diverse from those specifically shown and described, without departing from the spirit and scope of the invention.

We claim:

1. A fiber optic connector, comprising:
   an outer shell;
   a hollow cartridge-holding member secured in and to said shell;
   an axially-extending cartridge lying within and held by said cartridge-holding member;
   a plurality of fiber-optic terminal devices each containing an optical fiber and presenting the fiber for butt-end contact with the core end of a corresponding fiber of another connector;
   a shaped front flange on said cartridge extending radially therefrom near its front end, and having a plurality of openings through it, spaced about its periphery, each receiving and mounting, in an axially-extending direction, a different one of said fiber-optic terminals;
   a plurality of fiber-optic crimp bodies each receiving and holding, in crimped fashion, a different optical fiber extending through it;
   a shaped rear flange extending radially from said cartridge near its read end and being axially spaced apart from the shaped front flange to enable the fibers to freely flex within the connector, the shaped rear flange having a plurality of openings through it, spaced about its periphery each receiving and mounting, in an axially-extending direction, a different one of said crimp bodies;
   a plurality of optical fibers each extending through a different one of said crimp bodies and to a different one of said fiber-optic terminals, each of said fibers being fixedly secured in its respective crimp body and, at its forward end, positioned in its respective fiber-optic terminal;
   each of said terminals being mounted on said shaped front flange for axial motion with respect thereto, over a limited range; and
   spring members for spring-biasing each of said fiber-optic terminals forwardly with respect to said front flange while permitting the terminal to move rearwardly against the bias of its respective spring member.

2. The connector system of claim 1, comprising also a preload plate spaced forwardly of said shaped front flange and having openings through it into which the front ends of said terminals extend, each of said terminals having a radially-enlarged portion forming a shoulder abutting the rearward side of said preload plate and against which said preload plate can be urged to preload said spring members; and a locking structure acting between said preload plate and said cartridge holder for holding said preload plate in a position to preload said spring member.

3. The connector system of claim 2, comprising also a plurality of longitudinally split sleeves, each extending about the forward end of a different one of said terminals, and each having an empty portion at its forward end for receiving the end of a fiber-optic terminal of another connector.

4. The connector system of claim 3, comprising an alignment sleeve module fitting in and secured to said shell and having an axial opening therethrough for each of said split sleeves, said sleeves being positioned in said openings.

5. The connector system of claim 1, wherein each of said optical fibers extending through and secured to one of said crimp bodies is secured at its forward end to one of said optical fiber terminals which is circumferentially spaced around the axis of said cartridge with respect to said one crimp body.

6. The connector of claim 5, wherein the one of said fiber-optic terminals to which said each fiber is secured is the next one circumferentially from that fiber-optic terminal which is axially aligned with said one crimp body.

7. The system of claim 1, wherein said openings in said front and rear flanges comprise notches extending to the perimeters of said flanges, and into which said crimp bodies and said fiber-optic terminals fit when pressed laterally into said notches.

8. A fiber optic system, comprising:
   an outer shell;
   a cartridge mounted within and to said shell;
   said cartridge having a radial front flange and a plurality of fiber-optic terminals extending axially in positions circumferentially spaced about said front flange;
   an optical fiber secured to each of said terminals;
   a radially-extending rear flange on said cartridge, spaced apart rearwardly of said front flange to enable the fibers to freely flex within the connector, said front flange having a plurality of fiber-holding members mounted thereon and spaced about its periphery, for fixedly securing different ones of said fibers with respect to said shell;
   said terminals each being mounted for limited axial motion with respect to said forward flanges, and being spring-biased forwardly;
   each of said fibers extending rearwardly from said terminals through one of said fiber-securing members which is not axially aligned with the terminal to which said each fiber is secured.

9. The system of claim 8, wherein each of said fibers extends between one of said fiber-optic terminals and that one of said fiber-holding members which is circumferentially next to that fiber-holding member which is aligned with said one fiber-optic terminal.

10. A connector for optically coupling a plurality of optical fibers, comprising an outer shell having an open forward end to which another connector is to be mated and having a fiber-receiving rearward end at which said plurality of fibers enter said shell, an insert in said shell, a plurality of fiber-optic terminals each extending axially of said shell and each containing and securing the end of a different one of said fibers, said terminals being arranged parallel to each other in a circular pattern and mounted for limited axial motion, spring structures for spring-biasing said terminals toward said forward end of said shell, and fiber-securing members holding said fibers fixed with respect to said shell at a position adjacent to said rearward end thereof, the improvement wherein:

said insert comprises a cartridge axially aligned in said shell and having an axial shaft portion, a radial front flange and a radial rear flange positioned toward said rearward end of said shell and spaced apart from said front flange to enable the fibers to freely flex within the connector, said terminals being mounted about the periphery of said front flange and said fiber-securing members being mounted about the periphery of said rear flange, each of said fibers extending from one of said fiber-securing members to a corresponding one of said terminals, said fibers remaining slack over said range of motion of said terminals.

11. The connector of claim 10, wherein each of said fibers extending from one of said fiber-securing members to that one of said terminals which is spaced one position circumferentially from the terminal which is axially aligned with said one of said fiber-securing members.

* * * * *

UNITED STATES PATENT AND TRADEMARK OFFICE
CERTIFICATE OF CORRECTION

PATENT NO. : 5,283,848
DATED : February 1, 1994
INVENTOR(S) : Frederic H. Abendschein, et. al.

It is certified that error appears in the above-indentified patent and that said Letters Patent is hereby corrected as shown below:

Column 7, claim 1, line 21, "read" should be --rear--.

Signed and Sealed this

Twenty-eighth Day of June, 1994

Attest:

BRUCE LEHMAN

*Attesting Officer*  *Commissioner of Patents and Trademarks*